United States Patent
Kennedy, III et al.

[19]

[11] Patent Number: 5,966,658
[45] Date of Patent: Oct. 12, 1999

[54] AUTOMATED SELECTION OF A COMMUNICATION PATH

[75] Inventors: William C. Kennedy, III, Dallas; Kenneth R. Westerlage, Fort Worth; Dale E. Beasley, Flower Mound; James L. Gerstner, Plano, all of Tex.

[73] Assignee: HighwayMaster Communications, Inc., Dallas, Tex.

[21] Appl. No.: 08/718,951

[22] Filed: Sep. 26, 1996

[51] Int. Cl.$^6$ ............................... H04Q 7/24; H04Q 7/38
[52] U.S. Cl. ....................... 455/426; 455/428; 455/440; 455/445
[58] Field of Search .................................. 455/426, 427, 455/428, 432, 439, 440, 445, 512, 525; 342/357, 358; 379/220, 242, 243, 272

[56] References Cited

U.S. PATENT DOCUMENTS

| | | | |
|---|---|---|---|
| 5,142,654 | 8/1992 | Sonberg et al. | 455/433 |
| 5,159,625 | 10/1992 | Zicker | 455/432 |
| 5,173,933 | 12/1992 | Jabs et al. | 455/445 |
| 5,179,374 | 10/1993 | Winger | 455/440 |
| 5,179,721 | 1/1993 | Comroe et al. | 455/440 |
| 5,214,789 | 5/1993 | George | 455/440 |
| 5,235,633 | 8/1993 | Dennison et al. | 455/456 |
| 5,371,898 | 10/1994 | Grube et al. | 455/426 |
| 5,396,540 | 3/1995 | Gooch | 455/456 |
| 5,396,647 | 3/1995 | Thompson et al. | 455/440 |
| 5,422,813 | 6/1995 | Schuchman et al. | 701/214 |
| 5,442,806 | 8/1995 | Barber et al. | 455/435 |
| 5,444,450 | 8/1995 | Olds et al. | 342/357 |
| 5,465,388 | 11/1995 | Zicker | 455/404 |
| 5,500,648 | 3/1995 | Maine et al. | 342/550 |
| 5,502,757 | 3/1996 | Bales et al. | 455/414 |
| 5,619,551 | 4/1997 | Yahagi | 455/445 |
| 5,654,958 | 8/1997 | Natarajan | 455/445 |
| 5,761,195 | 6/1998 | Lu et al. | 455/445 |

OTHER PUBLICATIONS

"EIA/TIA Interim Standard—Cellular Radiotelecommunications Intersystem Operations: Functional Overview," EIA/IS–4.1–B, *Electronics Industries Association Engineering Department*, Jan., 1992, 14 pages and table of contents.

"EIA/TIA Interim Standard—Cellular Radiotelecommunications Intersystem Operations: Intersystem Handoff," EIA/TIA/IS–41.2–B, *Electronic Industries Association Engineering Department*, Jan., 1992, 25 pages and table of contents.

"EIA/TIA Interim Standard—Cellular Radio–Telecommunications Intersystem Operations: Automatic Raoming," EIA/TIA/IS–41.3–B, *Electronic Industries Association Engineering Department*, Dec., 1991, 64 pages and table of contents.

"EIA/TIA Interim Standard—Cellular Radiotelecommunications Intersystem Operations: Automatic Roaming," EIA/TIA/IS–41.3–B, *Electronic Industries Association Engineering Department*, Jan., 1992, 58 pages and table of Contents.

"EIA/TIA Interim Standard—Cellular Radiotelecommunications Intersystem Operations: Operations, Adminsitration, and Maintenance," EIA/TIA/IS–41.4–B, *Electronic Industries Association Engineering Department*, Jan., 1992, 29 pages and table of contents.

"EIA/TIA Interim Standard—Cellular Radiotelecommunications Intersystem Operations: Data Communications," EIA/TIA/IS–413.5–B, *Electronic Industries Association Engineering Department*, Jan., 1992, 84 pages and table of contents.

*Primary Examiner*—Willis R. Wolfe
*Attorney, Agent, or Firm*—Baker & Botts, L.L.P.

[57] ABSTRACT

An apparatus (32, 42) is provided for automatically selecting one of a plurality of alternate communication paths (16). The apparatus (32, 42) includes a database (74, 94) which stores information for at least one communication attribute relating to the plurality of alternate communication paths (16). A processor (72, 92) is coupled to the database (74, 94). The processor (72, 92) can automatically select one of the alternate communication paths (16) using the information for the communication attribute in response to a request for communication.

57 Claims, 5 Drawing Sheets

| LOCATION 106 | ATTRIBUTE A 108 | ATTRIBUTE B 110 | ATTRIBUTE C 112 | ATTRIBUTE D 114 |
|---|---|---|---|---|
| REGION 1 | PATH 3<br>PATH 1<br>PATH 2 | PATH 1<br>PATH 2 | PATH 1<br>PATH 2 | PATH 2 |
| REGION 2 | PATH 3<br>PATH 4<br>PATH 2 | PATH 4<br>PATH 2 | PATH 4<br>PATH 2 | PATH 2 |
| REGION 3 | PATH 3<br>PATH 4<br>PATH 5<br>PATH 2 | PATH 4<br>PATH 5<br>PATH 2 | PATH 4<br>PATH 2 | PATH 2 |
| REGION 4 | PATH 3<br>PATH 5<br>PATH 2 | PATH 5<br>PATH 2 | PATH 5<br>PATH 2 | PATH 2 |
| REGION 5 | PATH 3<br>PATH 6 | PATH 6 | PATH 6 | |
| REGION 6 | PATH 8<br>PATH 3<br>PATH 7 | PATH 8<br>PATH 7 | PATH 8<br>PATH 7 | PATH 8 |

| COMMUNICATION PATH | COVERAGE REGION | ATTRIBUTE 1 –COST | ATTRIBUTE 2 –VOICE | ATTRIBUTE 3 –DATA | ATTRIBUTE 4 –RELIABILITY | ATTRIBUTE 5 –CONFIRM | ATTRIBUTE 6 –PROP DELAY |
|---|---|---|---|---|---|---|---|
| PATH 1 | LAT/LONG COORDS 1 | 3 | 0 | 5 | 2 | 5 | 3 |
| PATH 2 | LAT/LONG COORDS 2 | 2 | 5 | 5 | 3 | 5 | 2 |
| PATH 3 | LAT/LONG COORDS 3 | 5 | 5 | 0 | 1 | 0 | 1 |
| PATH 4 | LAT/LONG COORDS 4 | 1 | 5 | 5 | 4 | 5 | 4 |
| PATH 5 | LAT/LONG COORDS 5 | 2 | 5 | 0 | 4 | 0 | 2 |
| PATH 6 | LAT/LONG COORDS 6 | 2 | 5 | 5 | 3 | 5 | 2 |
| PATH 7 | LAT/LONG COORDS 7 | 3 | 0 | 5 | 2 | 5 | 3 |

AUTOMATED SELECTION OF A COMMUNICATION PATH

TECHNICAL FIELD OF THE INVENTION

This invention relates to mobile communications, and more particularly to the automated selection of a communication path.

BACKGROUND OF THE INVENTION

Mobile communications technology has enjoyed substantial growth over the past decade. Many cars, trucks, airplanes, boats, and other vehicles are equipped with devices that allow convenient and reliable mobile communications. Advances in this technology have also lead to widespread use of hand-held, portable mobile communications devices.

In many cases, a plurality of alternate communication paths may be available to a mobile communications device. Each such communication path may be uniquely defined by any one or a combination of the following: a network of satellite-based or land-based transceivers, a public switched telephone network (PSTN), a mobile telecommunications switching office (MTSO), or any other suitable element for communications. Because each alternate path is uniquely defined, each path may have its own characteristics or features that make it more or less appropriate for communication in a certain instance. For example, a satellite-based communication path may have a relatively broad geographical range of coverage, and thus may be available for communication where no other path is. Consequently, the satellite-based communication path is appropriate if a communication must be made in an area where no alternative path is available. However, communication over a satellite-based path can be more expensive for some transactions than other communication paths. Thus, when the cost of communication should be considered, other paths may be more desirable if they are available.

SUMMARY OF THE INVENTION

In accordance with the present invention, the disadvantages and problems associated with selecting one of a plurality of alternate communication paths have been substantially reduced or eliminated. One aspect of the present invention provides a system and method for automatically selecting a communication path.

According to an embodiment of the present invention, an apparatus is provided for automatically selecting one of a plurality of alternate communication paths. The apparatus includes a database which stores information for at least one communication attribute relating to a plurality of alternate communication paths. A processor is coupled to the database. The processor can automatically select one of the alternate communication paths using the information for the communication attribute in response to a request for communication.

According to another embodiment of the present invention, a system is provided for communicating between a vehicle and a remote location. The system includes a plurality of alternate communication paths between the vehicle and the remote location. A dispatch is located at the remote location, and a mobile unit is located on the vehicle. At least one of the dispatch and the mobile unit has a database which stores information for at least one communication attribute relating to the alternate communication paths. At least one of the dispatch and mobile unit may automatically select, in response to a request for communication, one of the plurality of alternate communication paths using the information for the communication attribute.

According to yet another embodiment of the present invention, a method is provided for automatically selecting one of a plurality of alternate communication paths. The method includes receiving a request for communication. The request for communication comprises a communication attribute. A position fix is determined. One of a plurality of alternate communication paths is selected in response to the position fix and the request for communication.

Important technical features of the present invention include automatically selecting one of a plurality of alternate communication paths between a vehicle and a remote location. In one aspect of the invention, for various geographical areas, an order of preferred communication paths is specified according to various aspects (e.g., priority) of a communication. When communication is desired, a communication path can be selected from the order of preferred communication paths based upon the location of the vehicle. In another aspect of the invention, a plurality of alternate communication paths may each be rated or scored according to the path's ability to deliver or perform a particular characteristic function (e.g., delivery of voice, delivery of data, cost, current load, delay in transmission, propagation delay, reliability, diversity, or confirmation of receipt of data). When communication is desired, a communication request is received which may specify certain parameters for communication (e.g., type of information, amount of information, or priority). These parameters correspond to the functional characteristics of the paths. The appropriate scores for each path are retrieved and summed in response to the communication request, and the communication path having the highest score is then selected. Because the selection of a communication path is automatic, a user, such as a driver of the vehicle, is not distracted from other tasks, such as driving the vehicle. Because the parameters of the communication and the functional characteristics of the communication paths are considered, the most suitable path for communication is selected.

Another technical advantage includes selecting one of a plurality of communication paths between a vehicle and a remote location based, at least in part, upon the location of the vehicle. Different communication paths may be more desirable than others in a certain location. For example, one path may be a radio-frequency (RF) communication path owned and operated by the same entity maintaining and operating the vehicle. Because the cost of communication over such RF path can be relatively inexpensive for the entity, it is desirable to communicate over this path when the vehicle is located within the path's coverage area. To accomplish this, a mobile unit located on board the vehicle may include a positioning device and a processor. When communication is desired, the positioning device receives a position fix for the vehicle. The processor uses the position fix to select one of the plurality of communication paths.

Other technical advantages are readily apparent to one skilled in the art from the following figures, description, and claims.

BRIEF DESCRIPTION OF THE DRAWINGS

For a more complete understanding of the present invention and for further features and advantages, reference is now made to the following description taken in conjunction with the accompanying drawings, wherein like reference numerals represent like parts, in which.

DETAILED DESCRIPTION OF THE INVENTION

Figure 1:
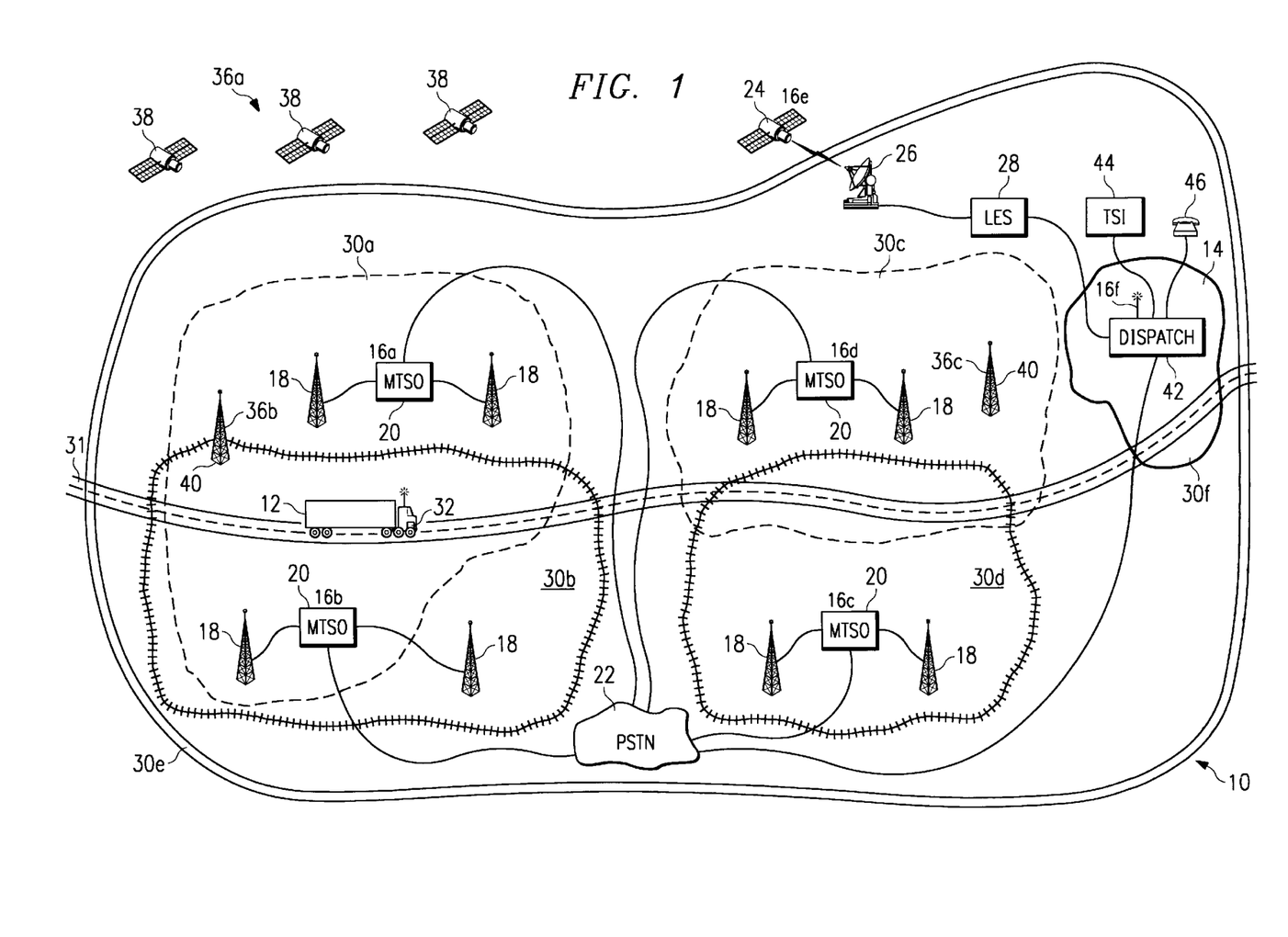
FIG. 1 illustrates a system for selecting one of a plurality of alternate communication paths for transmitting a message between a vehicle and a remote location.

FIG. 1 illustrates a system 10 for communicating between a vehicle 12 and a remote location 14 over any of a plurality of alternate communication paths 16.

Generally, each communication path 16 may be one or a combination of dedicated telephone lines, switched telephone lines, cellular phone lines, microwave communications links, satellite-based communications links, specialized mobile radio (SMR), enhanced specialized mobile radio (ESMR), a personal communications service (PCS), a citizen's band (CB), a dedicated radio system, such as those used by police and fire fighters, or any other suitable communication path that allows vehicle 12 to transmit signals to or receive signals from remote location 14. A communication path 16 may also comprise an SS7 backbone link or similar network for linking land-line or cellular switches in a public switched telephone network (PSTN). Such a link allows components of the PSTN to share information for validation, roaming, billing, call routing, and other functions. Each communication path 16 may be maintained and operated by a separate provider (e.g., a cellular telephone service provider) with associated rate structure and the like for the services provided.

Exemplary communication paths 16 are labeled as communication paths 16a through 16f in FIG. 1. At least a portion of the alternate communication paths 16 may be land-based cellular telephone networks, such as communication paths 16a, 16b, 16c, and 16d. Each of these land-based cellular telephone networks may comprise at least one transmitter site 18 coupled to a corresponding mobile telecommunications switching office (MTSO) 20. Each MTSO 20 may be coupled to a public switched telephone network (PSTN) 22. Other communication paths 16 may be satellite-based communication systems, such as communication path 16e. Exemplary communication path 16e includes a satellite 24 communicating with a transceiver 26. Transceiver 26 may be connected to a land-to-earth station (LES) 28 which routes communication to and from satellite 24. Still other communication paths 16 may comprise a radio-frequency (RF) path, such as communication path 16f. The RF path may be located at remote location 14.

Each communication path 16 may be characterized or defined by certain characteristics related to the technology, implementation, and/or provider of the path. These characteristics include, but are not limited to, cost of communication, delay in transmission, propagation delay, ability to deliver voice, ability to deliver data, ability to confirm receipt of communication, reliability, diversity, on-line connectability, capacity, speed, and the like. According to the present invention, as discussed below in more detail, the functional characteristics of a particular communication path 16 may be considered in selecting which communication path 16 should be utilized in a particular instance of communication.

Each instance of communication may be defined by various parameters, such as preferred time of communication, priority of communication, type of communication (e.g., data or voice), need to confirm receipt of information, current load, and the like. These parameters may correspond to the functional characteristics of the communication paths 16. For example, the communication parameters of data and voice types of communication correspond to the path characteristics of ability to deliver voice and ability to deliver data, respectively. Likewise, the parameter of confirmation receipt corresponds with the characteristic of ability to confirm receipt. The present invention also considers these parameters of the communication in selecting a suitable communication path 16.

Communication may be initiated by a user (e.g., a driver of vehicle 12 or a dispatcher at remote location 14), a device located on vehicle 12 or at remote location 14 (e.g., sensors on board vehicle 12), or any other suitable means for initiating communication. Communication over a communication path 16 may be implemented in a voice channel, control channel, paging channel, part of a seized voice or data channel, or overhead message stream currently implemented in cellular telephone technology or other suitable technology. Presently, the control channel provides paging of incoming calls, hand-off instructions, and other features of the cellular telephone network. Communication may also be implemented using any other analog or digital communications link between remote location 14 and vehicle 12, whether or not the communications link requires seizing of a voice or data channel, and whether or not a data encoder is used. Additionally, there are several developing technologies that may provide a convenient implementation for communication. For example, cellular digital packet data (CDPD) technology allows integration of data and voice using the existing cellular telephone infrastructure. In a CDPD system, digital packets of data and analog voice segments share the same channel. Other developments in digital cellular communications, such as code division multiple access (CDMA) and time division multiple access (TDMA), allow digital data and digital voice signals to be interspersed on a communications channel. These technologies integrate digital data transmission in a communication path 16, and therefore provide a convenient implementation scheme for communication.

Each of communication paths 16 may be available (i.e., provide communication service) for a particular area or region of coverage 30. With reference to FIG. 1, communication paths 16a through 16f provide coverage for regions 30a through 30f, respectively. It should be noted that the coverage regions 30 may overlap. For example, regions 30a and 30b, covered by communication paths 16a and 16b, respectively, overlap. Likewise, regions 30c and 30d, covered by communication paths 16c and 16d, respectively, also overlap. Such overlapping coverage may arise in areas, such as large metropolitan areas, where the demand for mobile communications is high. In this case, multiple providers may compete to provide communications services to users within the area. Furthermore, a coverage region 30 provided by one communication path 16 may be completely contained within a larger coverage region 30 provided by another communication path 16. For example, region 30e (covered by communication path 16e) encompasses regions 30a through 30d and 30f (covered by communications paths 16a through 16d, and 16f) respectively.

Figures 2, 3:
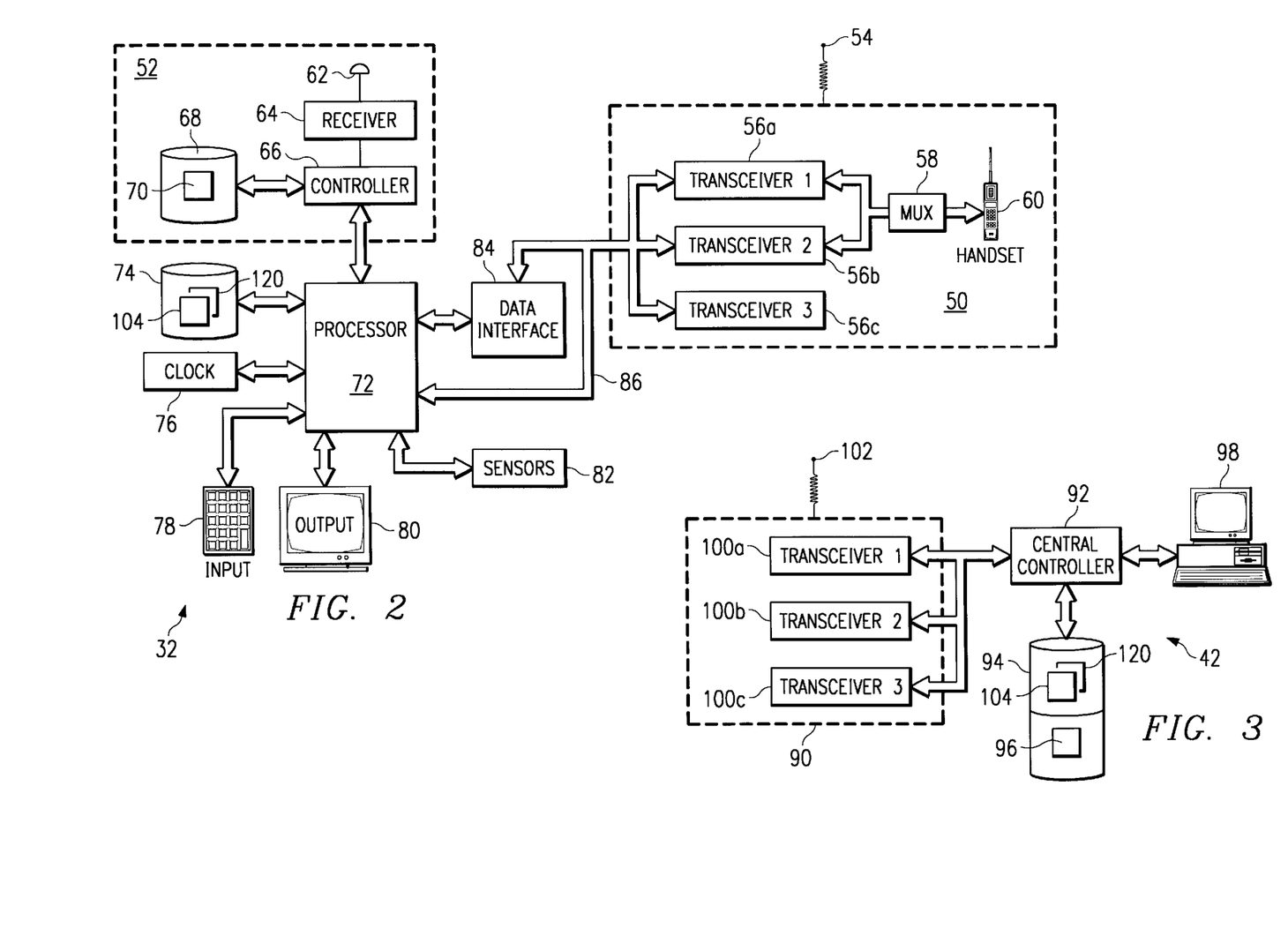
FIG. 2 is a schematic representation of a mobile unit.
FIG. 3 is a schematic representation of a dispatch.

As vehicle 12 travels along a route 31 through coverage regions 30, a mobile unit 32, located on vehicle 12, may be coupled to one or more of the alternate communication paths 16 at various points in time. The present invention contemplates mobile unit 32 being carried by all types of vehicles, including cars, trucks, airplanes, boats, barges, railcars, truck trailers, on a person's body, or any other movable object for which it is desirable to communicate with a remote location over any one of the plurality of alternate communication paths 16. For communication, mobile unit 32 comprises a mobile communications device 50 (FIG. 2). During any particular moment, mobile communications device 50 may be operable to communicate with remote location 14 using one or more, but not necessarily all, of the alternate communication paths 16. In other words, not every communication path 16 may be available for communication between vehicle 12 and remote location 14 at every moment in time. Mobile communications device 50 may transmit querying signals to determine which communication paths 16 are currently available. The querying signals may also serve to notify the various providers of available paths that vehicle 12 is traveling in the corresponding coverage regions 30.

Information about path availability may be conveyed to remote location 14 either by mobile unit 32 or by the providers of the available communication paths 16. For example, mobile unit 32 may generate and deliver call delivery information, which comprises any information that allows remote location 14 to deliver calls to vehicle 12. Call delivery information may include a system identification number (SID), a mobile serving carrier identification (MSCID), a switch identification (SWID), or any other identifier of a path provider. In addition, call delivery information can be an access number for the provider of a communication path 16, such as a number for a roamer access port (RAP). Alternatively, at times when vehicle 12 is traveling in the coverage region 30 of a "home" communication path 16, the home provider may convey path availability information to remote location 14. At other times, when vehicle 12 is outside of the coverage region 30 of a home communication path 16, providers of available paths may, register vehicle 12 as a roamer and notify the home path provider of the registration. The home path provider may then convey this information to remote location 14.

Mobile unit 32 on board vehicle 12 may also include a processor 72 (FIG. 2) which functions, among other things, to automatically select one of the available alternate communication paths 16. When selecting a communication path 16, processor 72 may consider the functional characteristics of each communication path 16 (e.g., cost of communication, ability to deliver voice and/or data, ability to confirm receipt, propagation delay, speed, current load, or capacity). Processor 72 may also consider the various parameters for the communication (e.g., priority, preferred cost, preferred transmission time, amount of information to be communicated, type of communication, or confirmation of receipt). The information for the communication parameters may be conveyed in the short-hand form of one or more communication attributes. In one embodiment, each communication attribute may define or establish an ordered sequence of preferred communication paths 16 according to the geographical position of vehicle 12 and the priority of the communication. This embodiment is described below in more detail with reference to FIGS. 4 and 5. In another embodiment, each communication attribute corresponds to a characteristic of a communication path 16. This embodiment is described below in more detail with reference to FIGS. 6 and 7. Processor 72 may be implemented as any suitable processor, such as a microprocessor, for receiving, processing, and/or outputting data in selecting a communication path 16. In one embodiment, processor 72 may be implemented as a fuzzy logic processor, a neural network, an expert system, or any other suitable artificial intelligence processor.

In selecting one of the alternate communication paths 16, mobile unit 32 may also consider the geographic location of vehicle 12. Accordingly, mobile unit 32 may comprise a mobile positioning receiver 52 (FIG. 2) operable to receive positioning determining information from a positioning system 36, such as exemplary positioning systems 36a, 36b, or 36c shown in FIG. 1. In general, a positioning system 36 comprises a plurality of space-based or land-based transmitters that emit information which can be used to determine position. The position determining information comprises accurate position and pseudo range data represented by the time of arrival of position determining information from a positioning system 36 to mobile unit 32. Positioning system 36 may be implemented as a land-based LORAN-C, a space-based GPS, a dead reckoning system, an inertial navigation system, or any other appropriate positioning technology.

Exemplary positioning system 36a is shown as a satellite-based radio navigation system, such as the NAVSTAR global positioning system (GPS). Positioning system 36a comprises a plurality of satellites 38 which transmit position determining information to mobile unit 32. Satellites 38 maintain accurate and synchronized time and simultaneously transmit position determining information that contains satellite specific and system information required by mobile unit 32 to determine the position of vehicle 12. The position determining information transmitted by satellites 38 may include high-precision clock and ephemeris data for a particular satellite 38, low-precision clock and ephemeris data for every satellite in a constellation ("almanac data"), health and configuration status for all satellites 38, user text messages, and other parameters describing operation of positioning system 36a. Positioning system 36a may also comprise additional satellites and one or more positioning receivers. The additional satellites may also communicate position determining information to mobile unit 32.

Exemplary positioning systems 36b and 36c are shown as land-based positioning systems, such as a LORAN-C system. Positioning systems 36b and 36c each may comprise a positioning receiver mounted on a transmitter site 40. Land-based positioning systems 36b and 36c may operate independently from satellite-based position system 36a to provide position determining information to mobile unit 32. Alternatively, positioning systems 36b and 36c may be used in conjunction with positioning system 36a to implement differential GPS techniques. In particular, the positioning receivers of systems 36b and 36c generate correction data that enables mobile unit 32 to more accurately determine the position of vehicle 12. The positioning receivers transmit the correction data to mobile unit 32 over any suitable link.

Using the position determining information and correction data from any of positioning systems 36a through 36c, and/or any other suitable positioning system 36, mobile unit 32 determines the position of vehicle 12. The positioning/correction information from positioning systems 36 and/or the position of vehicle 12 may be periodically relayed to remote location 14.

A dispatch 42 may be located at remote location 14. Dispatch 42 may be coupled to communication paths 16. In particular, dispatch 42 may be connected to PSTN 22, LES 28, and any other suitable link of a communication path 16. Dispatch 42 may be coupled to a time-slot interchange (TSI) switch 44 and a telephone 46. The TSI switch 44, which may be a digital access and cross-connect system (DACS), buffers and interchanges various signals.

The present invention contemplates that dispatch 42 can perform many of the same functions as mobile unit 32, including the automated selection of a suitable communication path 16. In this regard, dispatch 42 receives path availability information (e.g., call delivery information or roamer registration) from mobile unit 32 or the providers of available communication paths 16. Dispatch 42 may also receive position determining information and correction data from a positioning system 36 or position fixes from mobile unit 32. A central controller 92 (FIG. 3) at dispatch 42 uses the received path availability and/or positioning determining information, along with any other suitable information, such as the parameters of a communication or the characteristics of a communication path, to select one of the alternate communication paths 16.

In operation, vehicle 12 travels along route 31 which may cross into one or more coverage regions 30 served by separate communication paths 16. Each of communication paths 16 may be available for communication between vehicle 12 and remote location 14 at some point during travel. When a user (e.g., a driver of vehicle 12 or a dispatcher at remote location 14) or a device (e.g., a sensor on board vehicle 12) desires communication between vehicle 12 and remote location 14, a request for communication is initiated. The request may include one or more communication attributes. Each communication attribute may define a priority of communication or correspond to a characteristic of a communication path 16. Depending upon where the request is initiated, mobile unit 32 or dispatch 42 selects the most suitable, desired, or appropriate communication path 16 for communication between vehicle 12 and remote location 14 in response to the received information. In one embodiment, mobile unit 32 or dispatch 42 may use one or more position fixes provided by a positioning system 36, such as system 36a, 36b, or 36c, in order to select a communication path 16. In another embodiment, mobile unit 32 may query to determine which communication paths 16 are available, and vehicle 12 may be registered as a roamer in response to the querying. Mobile unit 32 or dispatch 42 then selects from the available paths.

FIG. 2 is a schematic representation of mobile unit 32, which may be located or carried on vehicle 12. Mobile unit 32 may include mobile communications device 50, positioning receiver 52, and other associated hardware and software, described below.

Mobile communications device 50 includes antenna 54, one or more transceivers 56 (labeled as 56a, 56b, and 56c), multiplexer 58, and a handset 60. In operation, mobile communications device 50 receives or transmits information at antenna 54 over any one of a plurality of communication paths 16. In one embodiment, antenna 54 may be implemented as a separate antenna for each type of communication path 16, such as land-based (e.g., communication paths 16a through 16d), satellite-based (e.g., communication path 16e), radio-frequency (e.g., communication path 16f), or any other suitable type of communication path 16. Alternatively, antenna 54 may be implemented as a hybrid antenna for use with various types of communication paths 16. Each of transceivers 56a through 56c may operate at a limited frequency or range of frequencies to receive and transmit information over a particular type of communication path 16. Each transceiver 56 may be dedicated solely to voice or solely to data communication, or, alternatively, may be used to communicate both voice and data. For example, transceivers 56a and 56b may be operable to communicate or relay voice signals, whereas transceiver 56c may be dedicated solely to the transmission and receipt of data signals. Transceivers 56a and 56b are coupled to handset 60 through multiplexer 58. Multiplexer 58 switches between transceivers 56a and 56b to transmit and receive signals as needed. Handset 60, which may provide traditional voice or data communication, relays the signals to and from a user of mobile unit 32. Alternatively, mobile communications device 50 may comprise a single transceiver 56 that is frequency agile so that it is capable of transmitting and receiving over a broad range of frequencies. Communications device 50 may also be operable to query one or more communication paths 16 to determine the availability of each path for communication. For this purpose, communications device 50 may transmit one or more querying signals in one or more formats to the various communication paths 16.

Mobile positioning receiver 52 may include an antenna 62, a receiver 64, a controller 66, and a memory 68 which stores data 70. In operation, mobile positioning receiver 52 receives position determining information from satellites 38 of positioning system 36a and/or transmitter 40 of positioning systems 36b or 36c at antenna 62. Receiver 64 processes the position determining information to extract ephemeris, almanac, and clock correction data. Controller 66 receives the position determining information and computes a vehicle position for vehicle 12. These calculations performed by controller 66 may use data 70 stored in memory 68.

Additional hardware and/or software coupled to mobile positioning receiver 52 and mobile communications device 50 include a processor 72. Accordingly, processor 72 may receive position determining information from positioning receiver 52 and/or availability information resulting from the querying tests performed by communications device 50. Processor 72 manages the communicating, calculating, locating, and reporting features of mobile unit 32. In particular, processor 72 functions to select the most appropriate communication path 16 for communication between mobile unit 32 and dispatch 42. Processor 72 may also generate call delivery information (e.g., SID, MSCID, SWID, or RAP) or any other suitable path availability information. Processor 72 can direct that this path availability information, the positioning determining information received or generated by mobile positioning receiver 52, and any other suitable information be transmitted to dispatch 42 at remote location 14. Processor 72 may be implemented as any suitable processor, including a fuzzy logic processor, a neural network, an expert system, some other form of artificial intelligence, or any other processing implementation.

A memory 74 may be coupled to processor 72. Memory 74 can be implemented as random access memory (RAM), read-only memory (ROM), CD-ROM, removable memory devices, FLASH, or any other device that allows storage or retrieval of data. Memory 74 may contain data, such as programs, maps, databases, tables, and other information required by processor 72 to perform its functions. In particular, this data may include exemplary tables 104 and 120 (FIGS. 4 and 6, respectively) containing information relating to one or more communication attributes described above. Tables 104 and 120 may be used by processor 72 in selecting a suitable communication path 16.

Processor 72 and controller 66, as well as memory 74 and memory 68, may be separate or integral components of mobile unit 32. Mobile unit 32 contemplates any arrangement, processing capability, or task assignment between mobile positioning receiver 52, mobile communications device 50, and processor 72. Accordingly, mobile unit 32 may also include a clock 76 coupled to processor 72, that can be used to synchronize the operations of mobile unit 32.

One or more input devices 78 may be coupled to processor 72. Input device 78 may be implemented as a keypad or touch screen, as well as voice recognition software and hardware that can accept audible commands and information. Input device 78 may also include fixed or removable storage media, such as magnetic computer disks, CD-ROM, or other suitable media to provide input to processor 72 or memory 74. Input device 78 may be operable to receive a request for communication from a user, such as a driver of vehicle 12.

Mobile unit 32 may also include one or more output devices 80, which may be coupled to processor 72. Output device 80 may be implemented as a display or printer presenting visual information. Alternatively, output device (s) 80 may produce audible information to the operator of vehicle 12. Like input device 78, output device 80 may include fixed or removable storage media, such as magnetic computer disks, CD-ROM, or other suitable media to receive output from processor 72 or memory 74.

One or more sensors 82 may provide information to processor 72. For example, sensors 82 may include various engine sensors, truck trailer sensors, security monitors, or other devices generating information on the status or condition of mobile unit 32, vehicle 12, or its operator. The generation and transmission of this information may be based on elapsed time, movement of mobile unit 32, sensor readings, or any other piece of information that may necessitate reporting to a remote location. Sensors 82 may generate a request for communication to processor 72.

Components of mobile unit 32 shown in FIG. 2 may be packaged into one or more housings. Mobile unit 32 may be mounted to vehicle 12, or alternatively, mobile unit 32 may be packaged as a portable, hand held device that provides personal communicating, locating, timing, and reporting functions.

Figure 4:
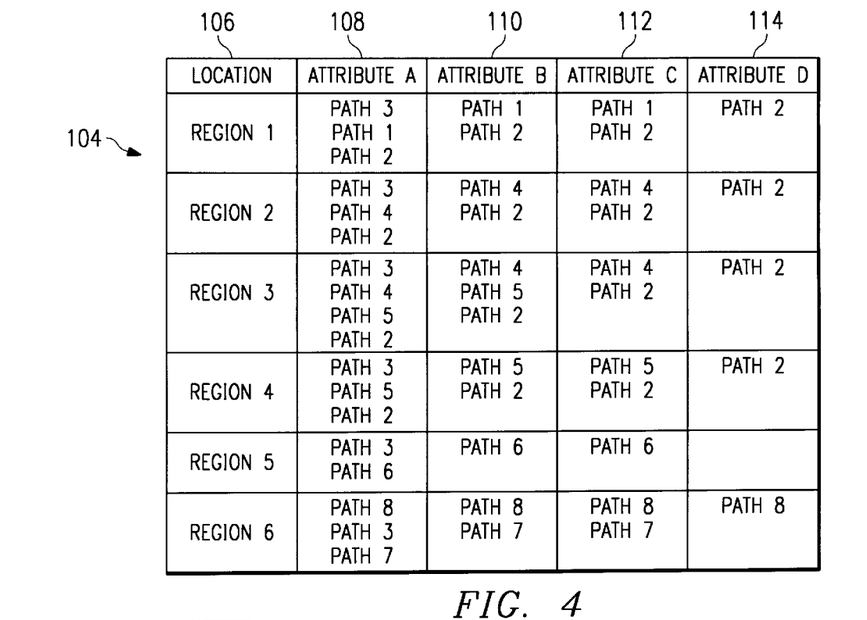
FIG. 4 illustrates an exemplary table which is used in selecting one of a plurality of alternate communication paths, according to an embodiment of the present invention.
Figure 6:
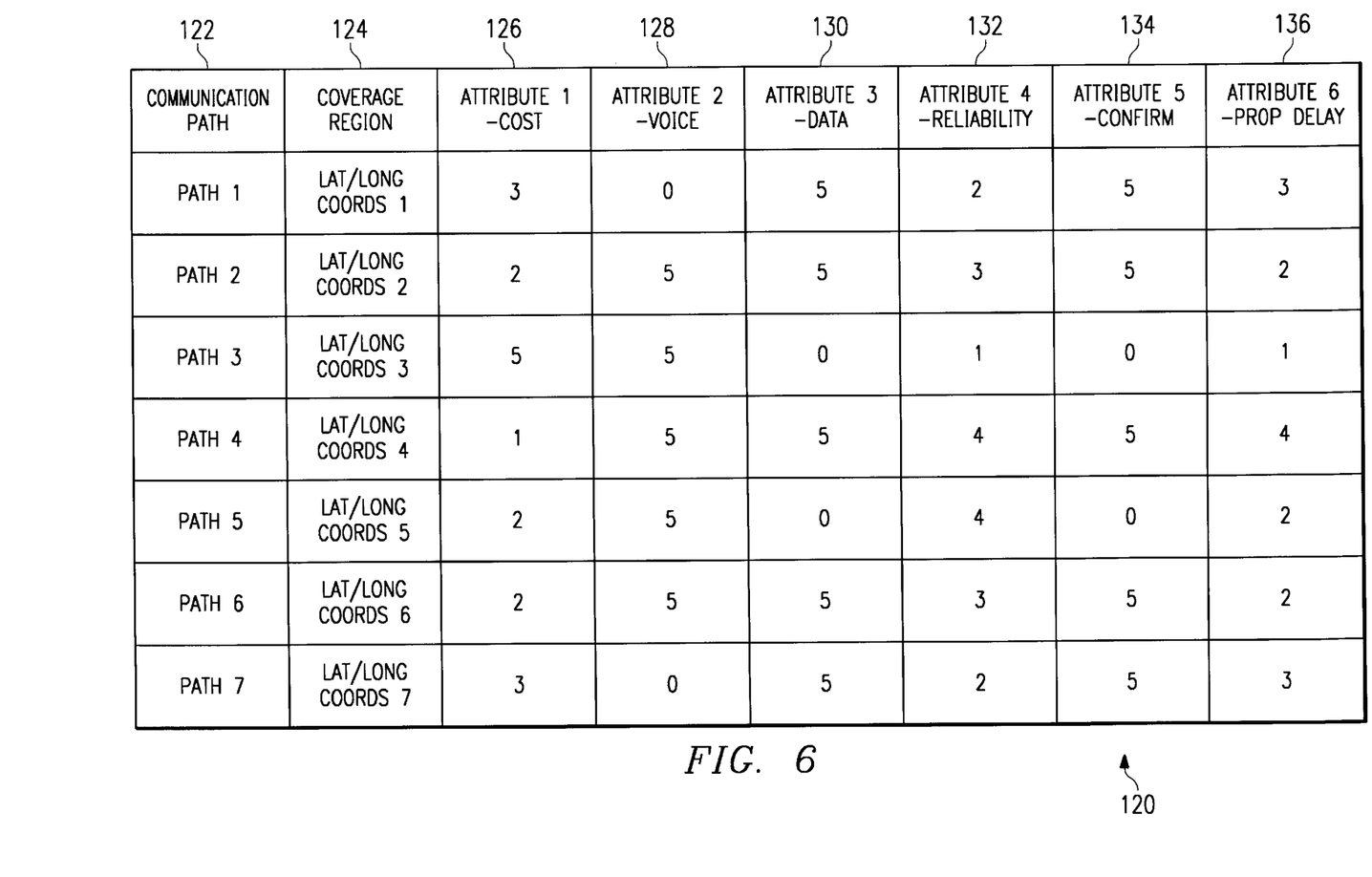
FIG. 6 illustrates an exemplary table which is used in selecting one of a plurality of alternate communication paths, according to another embodiment of the present invention.

In operation, mobile unit 32 may receive a request for communication from either a user (via input device 78) or a sensor 82. Such a request for communication may specify various parameters for the communication, including priority, preferred cost, preferred transmission time, amount of information to be communicated, type of communication (e.g., data and/or voice), confirmation of receipt, and the like. This information may be conveyed in the form of one or more communication attributes. In response, processor 72 may obtain positioning determining information from mobile positioning receiver 52 and/or path availability information from mobile communications device 50. Furthermore, processor 72 may retrieve data, such as table 104 or table 120, relating to various alternate communication paths 16 from memory 74. Using this information, processor 72 selects the most appropriate communication path 16 for communication. The content of the communication is then sent from processor 72 through a data interface 84 or a direct link 86 to any of transceivers 56*a* through 56*c* for transmission over antenna 54.

FIG. 3 is a schematic representation of dispatch 42, which may be located at remote location 14. Dispatch 42 may include a communications device 90, a central controller 92, a memory 94 storing data 96, an input/output device 98, and other associated hardware and software.

Communications device 90 may include one or more transceivers 100, such as exemplary transceivers 100*a*, 100*b*, and 100*c*. Each of transceivers 100*a* through 100*c* functions to transmit and receive information from one or more communication paths 16. The information which is received may include path availability and positioning determining information sent by mobile unit 32 on board vehicle 12. Each transceiver 100*a* through 100*c* may be used for receiving signals from a particular type of communication path 16, such as land-based (e.g., communication paths 16*a* through 16*d*), satellite-based (e.g., communication path 16*e*), RF (e.g., communication path 16*f*), or any other suitable type of communication path 16. Communications device 90 may include an antenna 102 which receives and transmits signals to one or more communication paths 16. Like antenna 54 shown in FIG. 2, antenna 102 may be implemented as a hybrid antenna or a plurality of separate antennas. Each of transceivers 100*a* through 100*c* may be dedicated to either voice or data communication, or alternatively, can be used for both voice and data communication. In another embodiment, transceiver 100 may be a frequency agile transceiver operable to receive and transmit signals over a broad range of frequencies.

Central controller 92 is coupled to communications device 90. Central controller manages the communicating, calculating, and reporting features of dispatch 42. The functionality of central controller 92 may be performed by a processor, such as a main-frame, file server, work station, or other suitable data processing facility running appropriate software. Like processor 72 of mobile unit 32, central controller 92 may select one of the plurality of alternate communication paths 16 for communication between vehicle 12 and remote location 14. For example, central controller 92 may perform a call delivery function that routes calls to mobile unit 32 through any one of communication paths 16. To select a communication path 16, central controller 92 may use the path availability and positioning determining information received from vehicle 12 or path providers.

Memory 94 is coupled to central controller 92. Memory 94 may be implemented as RAM, ROM, CD-ROM, disk, tape storage, removable memory devices, FLASH, or any other device that allows storage or retrieval of data. Memory 94 may contain databases, tables, charts, maps, or any other information, such as exemplary tables 104 and 120, which can be used in selecting a communication path 16. Memory 94 may also store other data 96, which can include path availability and/or positioning determining information received from vehicle 12 or providers of communication paths 16.

Input/output device 98 may be implemented as one or more suitable input devices, such as a keyboard, touch screen, mouse, input port, removable storage media, or other suitable device that can accept information, and one or more suitable output devices, such as a computer display, printer, speaker, removable storage media, or output port, for conveying information associated with the operation of dispatch 42, including digital data, visual information, or audio information. Input/output device 98 may be operable to receive a request for communication from a user, such as a dispatcher, or a device at remote location 14.

FIG. 4 illustrates an exemplary table 104 which can be used in selecting one of a plurality of alternate communication paths 16, according to one embodiment of the present invention. Table 104 may be stored in memory 74 of mobile unit 32 on board vehicle 12 and/or in memory 94 of dispatch 42 at remote location 14. Table 104 may comprise a plurality of columns, such as columns 106 through 114.

A location column 106 includes a plurality of entries, each of which specifies a geographical region through which vehicle 12 may travel. These regions may be identified by latitudinal and longitudinal coordinates, or any other suitable geographical identifiers. Preferably, the regions specified by the entries in location column 106 do not overlap. Rather, each region borders upon one or more adjacent regions with no overlap between regions. It should be noted that these regions do not correspond to the coverage regions 30 of communication paths 16 illustrated and described with reference to FIG. 1.

Different communication paths 16 may be available for communication in the various regions specified in location column 106. For example, in one region, "PATH 1," "PATH 2," and "PATH 3" may be available, whereas in another region, "PATH 3," "PATH 7," and "PATH 8" may be available. Each communication path 16 in a region may have its own unique characteristics. For example, "PATH 2" may be characterized by a relatively long propagation delay, low-cost of transmission, capability to communicate data signals only, and poor reliability. In contrast, "PATH 3" may be characterized by relatively short propagation delay, high-cost of transmission, capability to communicate both voice and data signals, and excellent reliability.

Each of columns 108 through 114 may be an attribute column relating to a particular communication attribute. In this embodiment, a communication attribute defines or represents a priority for the communication. As shown in FIG. 4, the communication attributes are referred to as "attribute A," "attribute B," "attribute C," and "attribute D," wherein attribute A designates a communication of highest priority and attribute D designates a communication of lowest priority. A separate attribute column 108 through 114 is provided for each of attributes A through D.

The various entries in attribute columns 108 through 114 each correspond to one of the regions specified in location column 106. Each entry specifies none, one, or a plurality of alternate communication paths 16 for communication in the corresponding region. The communication paths 16 specified in any particular entry are preferably ordered. In other words, mobile unit 32 will attempt communication in a defined order over the specified communication paths 16. If communication can be established on the first preferred communication path, then the communication will be transmitted over such path. Otherwise, mobile unit 32 will attempt communication on the next preferred path. For example, the entry in attribute column 108 corresponding to "REGION 1" specifies the order of "PATH 3," "PATH 1," and "PATH 2." The order dictates the sequence by which communication will be attempted over the different paths 16. Mobile unit 32 will first attempt communication over "PATH 3." If communication cannot be established over "PATH 3," mobile unit 32 then attempts communication over "PATH 1." If the communication again cannot be established, then "PATH 2" is attempted.

It should be noted that not all communication paths 16 available in a particular region may be used for communicating a particular communication. More specifically, higher priority communications may be transmitted over any of the communication paths 16 available in the region, whereas lower priority messages may be transmitted over only select or none of the available communication paths 16. For example, in "REGION 3," an attribute A communication may be communicated over any of "PATH 2," "PATH 3," "PATH 4," and "PATH 5," but an attribute D communication may only be communicated over "PATH 2." In this manner, communication paths 16 having certain characteristics, such as high costs, may be reserved for more important communications.

In operation, table 104 may be used in conjunction with receipt of position information from a positioning system, such as 36a, 36b, or 36c. Once position is determined, mobile unit 32 or dispatch 42 may access table 104 in order to select a communication path 16 for communication. For example, the position determining information may indicate that vehicle 12 is in "REGION 3" specified in location column 106. Thus, communication between vehicle 12 and remote location 14 may occur over any one of various communication paths 16, including "PATH 2," "PATH 3," "PATH 4," and "PATH 5," according to the priority of the communication. One or more of these communication paths 16 are listed in each of the corresponding entries of attribute columns 108 through 114. If the communication is designated as an attribute A communication, then any of "PATH 3," "PATH 4," "PATH 5," and "PATH 2," can be used. Likewise, if the communication is designated as an attribute B communication, any of "PATH 4," "PATH 5," and "PATH 2" can be used. If the communication is an attribute C communication, "PATH 4" and "PATH 2" can be used. For an attribute D communication, "PATH 2" can be used.

Figure 5:
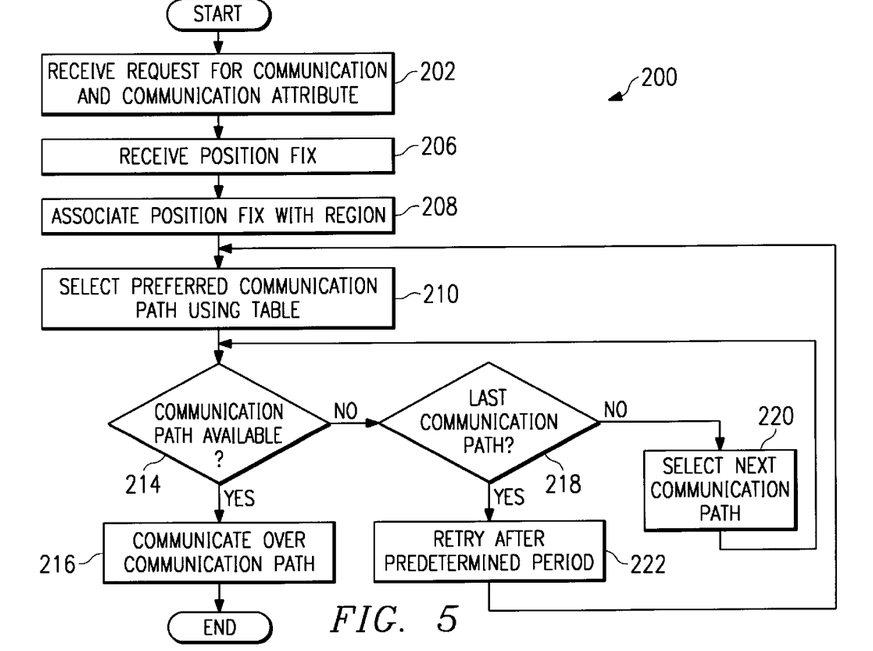
FIG. 5 is a flow chart for selecting one of a plurality of alternate communication paths using the table shown in FIG. 4.

FIG. 5 is a flow chart of a method 200 for selecting one of a plurality of alternate communication paths 16 using table 104 shown in FIG. 4. By way of example and for clarity, the following primarily describes the performance of method 200 by mobile unit 32 on board vehicle 12. It should be understood, however, that the steps of method 200 may be performed by dispatch 42 located at remote location 14 in substantially the same manner.

Method 200 begins at step 202 where a request for communication is received by mobile unit 32. Such request may be generated by a user (e.g., a driver of vehicle 12) or by one or more devices (e.g., sensors 82). The request may include a communication attribute (e.g., attribute A, B, C, or D) which defines or specifies a priority for the communication.

Mobile positioning receiver 52 of mobile unit 32 determines a position fix for vehicle 12 at step 206. It should be noted that if dispatch 42 is performing the steps of method 200, dispatch 42 receives positioning determining information from mobile unit 32 and/or positioning systems 36. Processor 72 of mobile unit 32 accesses table 104 in memory 74. Mobile unit 32 associates the position fix with one of the regions specified in location column 106 of table 104 by determining the region within which vehicle 12 is currently located at step 208.

The communication attribute is associated with one of attribute columns 108 through 114. Based upon the communication attribute and the geographic region of vehicle 12, processor 72 references the appropriate entry in the attribute columns to select a communication path 16 at step 210. Specifically, mobile unit 32 selects the first preferred communication path 16 specified in such entry.

Mobile unit 32 determines whether the selected communication path 16 is available at step 214. In one embodiment, mobile communications device 50 of mobile unit 32 transmits a signal to query the selected communication path 16 for availability. It should be understood that if dispatch 42 is performing method 200, dispatch 42 receives path availability information from mobile unit 32 or from one or more path providers. If the communication path 16 is available, mobile unit 32 communicates over the selected communication path 16 at step 216.

Otherwise, if it is determined that the selected communication path 16 is not available, mobile unit 32 determines whether the selected communication path 16 is the last communication path 16 contained within the appropriate entry in attribute columns 108 through 114 at step 218. If other communication paths 16 are specified in the entry, mobile unit 32 selects the next preferred communication path 16 at step 220. Mobile unit 32 then returns to step 214 where it tests the selected communication path 16 for availability.

Mobile unit 32 repeats steps 214–220 until communication is established over a preferred path or no alternate communication paths 16 are specified in the entry. If communication cannot be made over any of the communication paths 16 specified in the entry, then mobile unit 32 re-attempts communication after a predetermined period at step 222.

FIG. 6 illustrates a table 120 which can be used in selecting one of a plurality of alternate communication paths 16, according to another embodiment of the present invention. Like table 104 shown in FIG. 4, table 120 may be stored in memory 74 of mobile unit 32 and/or memory 94 of dispatch 42. Table 120 comprises a plurality of columns 122 through 136.

A communication path column 122 includes a plurality of entries, each of which specifies one of the alternate communication paths 16. Each communication path 16 may be a particular type of technology (e.g., satellite-based, land-based, or radio-frequency) maintained and operated by a particular provider (e.g., cellular telephone service provider). A service area column 124 includes a plurality of entries, each entry specifying the coverage region 30 for a corresponding communication path 16 identified in communication path column 122. The entries in service area column 124 may comprise latitudinal and longitudinal coordinates defining the geographical area of the coverage region 30. In one embodiment, a grid is transposed upon a map of the area over which vehicle 12 may travel. The grid separates the area into a plurality of cells, all cells being approximately the same size. Each cell is associated with one or more coverage regions 30. A database specifying information relating to the cells may be generated and maintained, and then used in conjunction with table 120 to define the coverage regions 30. As described above, the coverage regions 30 for various communication paths 16 may overlap. Thus, multiple communication paths 16 may be available for the same geographical position of vehicle 12. Like table 104 shown in FIG. 4, table 120 includes a number of attribute columns 126 through 136. In contrast to table 104, however, the attributes in table 120 correspond to various characteristics of a communication path 16. These characteristics may include, but are not limited to, cost of communicating over the path, capability of providing voice, capability of providing data, reliability, speed, capacity, capability of confirming receipt of communication, and propagation delay associated with the communication path 16. Attribute columns 126 through 136 each comprise a plurality of entries, wherein each entry specifies a score for a particular characteristic of a communication path 16. As explained below in more detail, a scoring method represents the ability of various communication paths 16 to deliver the characteristic. The value of each score in a particular column 126 through 136 is relative to the other scores in the same column.

The scores in an attribute cost column 126 represent the relative cost of communicating over an associated communication path 16 specified in column 122. A low score indicates that the cost of communicating over the path is relatively expensive, whereas a high score indicates that the cost of communicating is relatively inexpensive. Each score in an attribute voice column 128 represents the ability of the corresponding communication path 16 to deliver voice signals. A high score indicates that the path is capable of delivering voice signals, whereas a score of "zero" indicates that the path cannot deliver voice signals. Likewise, the scores in an attribute data column 130 represent the ability of the corresponding communication path 16 to deliver data signals. A high score indicates that the communication path 16 is capable of carrying data information, whereas a score of "zero" indicates an inability of the path to deliver data information.

Each score in an attribute reliability column 132 represents the relative reliability of communicating over the associated path identified in column 122. A high score indicates that the path is relatively reliable, whereas a low score indicates that the path is relatively unreliable. The scores in an attribute confirmation column 134 represent the ability of each communication path 16 to provide a confirmation for the receipt of a communication. A high score indicates that the path is able to provide receipt of confirmation, whereas a score of "zero" indicates the path is unable to provide confirmation. The scores in an attribute propagation delay column 136 represent the relative propagation delay associated with communicating over the corresponding communication path 16. In this case, a high score indicates that the propagation delay is relatively short, whereas a low score indicates that the propagation delay is relatively long.

It should be understood that in other embodiments, other communication attributes may be included in addition to, or instead of, the attributes specified in columns 126 through 136. It is contemplated that any appropriate communication attribute characterizing a communication path may be contained in table 120. Suitable scores would appear in the column for each communication attribute to enable a scoring method for communication path selection.

Figure 7:
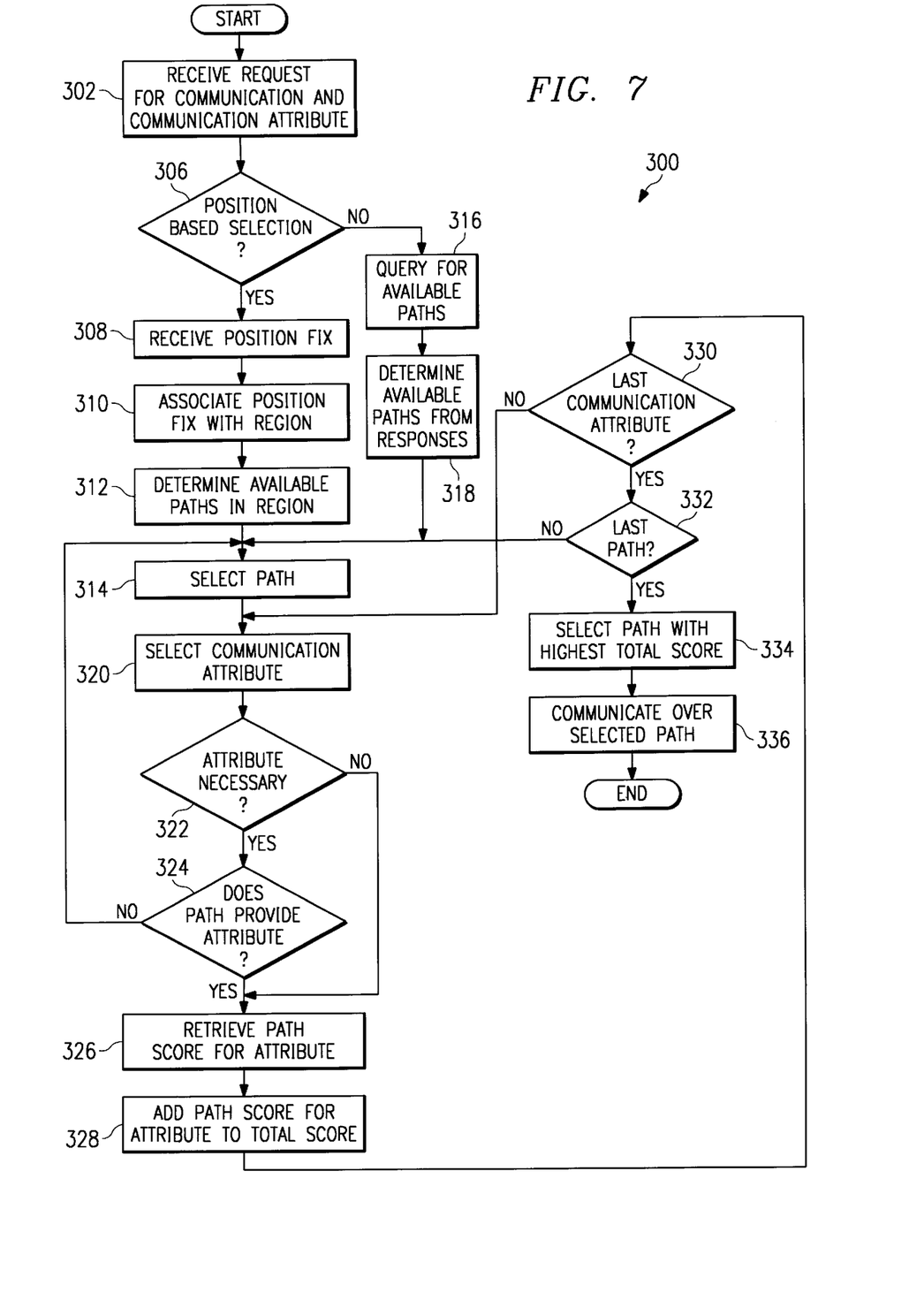
FIG. 7 is a flow chart for selecting one of a plurality of alternate communication paths using the table shown in FIG. 6.

FIG. 7 is a flow chart of a method 300 for selecting one of a plurality of alternate communication paths 16 using table 120 shown in FIG. 6. For clarity and by way of example, the following primarily describes the performance of method 300 by mobile unit 32 on board vehicle 12. However, it should be understood that the steps of method 300 can also be performed by dispatch 42 at remote location 14 in substantially the same manner.

Method 300 begins at step 302, where mobile unit 32 receives a request for communication, either from a user or a sensor 82. The request for communication, which may be input at input device 78, may specify one or more communication attributes. Each communication attribute may correspond to a functional characteristic for the communication paths 16, such as cost, reliability, propagation delay, or the ability to provide voice, data, or confirmation receipt. In response to the request for communication, processor 72 of mobile unit 32 may access table 120.

Mobile unit 32 queries whether the selection of one of a plurality of alternate communication paths 16 should be position-based at step 306. If the selection should be position-based, then mobile positioning receiver 52 of mobile unit 32 receives a position fix from a positioning system 36 (e.g., 36*a*, 36*b*, or 36*c*) at step 308. It is understood that if dispatch 42 is performing method 300, then dispatch 42 utilizes position information received from mobile unit 32 and/or positioning system 36. Processor 72 of mobile unit 32 may then associate the received position fix with one or more coverage regions 30 specified in column 124 of table 120 at step 310. For example, if a database having information for a plurality of cells is generated and maintained, then the position fix may be referenced against the cell information to determine the cell in which the position fix is located; the cell information may specify one or more coverage regions 30. Using this information, processor 72 determines the available communication paths 16 at step 312. Mobile unit 32 then selects one of the available paths at step 314.

If on the other hand, it is determined at step 306 that the selection should not be position-based, then mobile communications device 50 of mobile unit 32 transmits query signals to determine the available communication paths 16 at step 316. It should be noted that if dispatch 42 is performing method 300, then dispatch 42 utilizes path availability information received from either mobile unit 32 or a path provider. If a particular communication path 16 is available, then that path will transmit a response to mobile unit 32. Mobile unit 32 then determines available paths 16 from the received responses at step 318. Mobile unit 32 selects a path at step 314.

Processor 72 of mobile unit 32 then selects one of the previously received communication attributes at step 320. At step 322, mobile unit 32 determines whether the selected communication attribute is necessary for the communication at step 322. If the attribute is necessary, then processor 72 determines whether the selected communication path 16 provides or is able to deliver such attribute at step 324. If the path does not provide the attribute, then mobile unit 32 returns to step 314 where another available communication path is selected. For example, in some instances, it is desirable to confirm that a communication has been received. If a particular communication path 16 is not able to provide confirmation receipt, another path 16 will be selected.

On the other hand, if it is determined that the selected communication attribute is not necessary at step 322, or alternatively, that the selected path does provide the attribute at step 324, then mobile unit 32 retrieves an attribute score for the path from an appropriate column 126 through 136 of table 120 at step 326. As stated above, the score represents the relative ability of the path 16 to deliver the functional characteristic corresponding to attribute. Processor 72 of mobile unit 32 adds the attribute score to the total score for the selected path at step 328. Processor 72 then determines whether there are additional communication attributes to be considered at step 330. If additional communication attributes are to be considered, mobile unit 32 returns to step 320 where the next communication attribute is selected. Mobile unit 32 repeats steps 320 through 330 until a total score for the communication path 16 is produced.

When processor 72 determines that no additional communication attributes are to be considered at step 330, then mobile unit 32 determines whether there are additional available paths 16 to be considered at step 332. If additional available communication paths 16 are to be considered, mobile unit 32 returns to step 314 where the next available path is selected. Mobile unit 32 repeats steps 314 through 332 for each available communication path 16 until a total score has been produced for that path, or the path is eliminated because it does not provide a necessary communication attribute for the communication.

Mobile unit 32 then selects the communication path 16 with the highest total score and that delivers all necessary attributes at step 334. Mobile unit 18 communicates over the selected path at step 336.

The present invention contemplates other embodiments in which attributes are used to determine a communication path 16. For example, in one embodiment, the desired attributes of a communication path 16 can be individually selected and/or weighted appropriately for each message so that the communication path 16 which is best able to deliver the selected attribute is chosen. This can be accomplished by maintaining a database containing information specifying the ability of each communication path 16 to deliver each attribute in a number of geographical areas. When communication is desired in one of the geographical areas, information can be retrieved from the database and compared to the selected and/or weighted attributes.

Although the present invention has been described with several embodiments, various changes and modifications may be suggested to one skilled in the art, and it is intended that the present invention encompass such changes and modifications as fall within the scope of the appended claims.

What is claimed is:

1. An apparatus for automatically selecting one of a plurality of communication paths, the apparatus comprising:
   a memory operable to store a plurality of ordered lists of communication paths, each ordered list associated with one of a plurality of communication attributes, each communication attribute representing a separate priority for communication; and
   a processor operable to receive a request for communication, the request indicating a communication attribute, the processor further operable to automatically select a communication path from an ordered list associated with the indicated communication attribute.

2. The apparatus of claim 1, further comprising an input device operable to receive the request for communication from a user.

3. The apparatus of claim 1, wherein a first ordered list associated with a communication attribute representing a higher priority for communication includes more communication paths than a second ordered list associated with a communication attribute representing a lower priority for communication.

4. The apparatus of claim 1, wherein the processor selects a first available communication path from the ordered list associated with the indicated communication attribute.

5. The apparatus of claim 1, further comprising a positioning device coupled to the processor and operable to determine a position fix, wherein the processor is further operable to automatically select a communication path in response to the position fix.

6. The apparatus of claim 5, wherein the positioning device is a GPS receiver.

7. The apparatus of claim 5, wherein:
   each ordered list is associated with one of a plurality of geographic regions; and
   the processor relates the position fix to a geographic region and automatically selects a communication path from an ordered list associated with the communication attribute and the geographic region.

8. A method for automatically selecting one of a plurality of communication paths, the method comprising:
storing a plurality of ordered lists of communication paths, each ordered list associated with one of a plurality of communication attributes, each communication attribute representing a separate priority for communication;
receiving a request for communication, the request indicating a communication attribute; and
selecting a communication path from an ordered list associated with the indicated communication attribute.

9. The method of claim 8, further comprising:
associating each ordered list with one of a plurality of geographic regions;
determining a position fix;
relating the position fix to a geographic region; and
selecting a communication path from an ordered list associated with the communication attribute and the geographic region.

10. The method of claim 8, wherein receiving a request for communication further comprises receiving a request for communication from an input device operated by a user.

11. The method of claim 8, wherein selecting a communication path from an ordered list further comprises selecting a first available communication path from the ordered list.

12. The method of claim 8, further comprising:
determining a position fix; and
selecting a communication path from an ordered list using the position fix.

13. The method of claim 12, wherein determining a position fix further comprises using a GPS receiver to determine a position fix.

14. An apparatus for automatically selecting one of a plurality of communication paths, the apparatus comprising:
a memory operable to store a plurality of scores, each score associated with one of a plurality of communication paths and a communication attribute; and
a processor operable to receive a request for communication, the request indicating a communication attribute, the processor further operable to retrieve a score for each communication path using the indicated communication attribute, the processor further operable to automatically select a communication path based on the retrieved scores.

15. The apparatus of claim 14, further comprising an input device operable to receive the request for communication from a user.

16. The apparatus of claim 14, wherein:
the indicated communication attribute is necessary for communication; and
the processor selects a communication path that is able to provide the indicated communication attribute.

17. The apparatus of claim 14, wherein the communication attribute relates to a transmission delay or a propagation delay of a communication path.

18. The apparatus of claim 14, wherein the communication attribute relates to the reliability of a communication path or an ability of a communication path to provide a confirmation of a successful communication.

19. The apparatus of claim 14, wherein the communication attribute relates to a capability of a communication path to communicate voice signals or a capability of a communication path to communicate data.

20. The apparatus of claim 14, wherein the scores are numeric.

21. The apparatus of claim 14, further comprising a positioning device coupled to the processor and operable to determine a position fix, wherein the processor is further operable to use the position fix to determine that each communication path is available prior to retrieving a score for each communication path.

22. The apparatus of claim 21, wherein the positioning device is a GPS receiver.

23. The apparatus of claim 21, wherein the processor determines that each communication path is available if the position fix is located within a coverage region associated with each communication path.

24. A method for automatically selecting one of a plurality of communication paths, the method comprising:
storing a plurality of scores, each score associated with one of a plurality of communication paths and a communication attribute;
receiving a request for communication, the request indicating a communication attribute;
retrieving a score for each communication path using the indicated communication attribute; and
selecting a communication path based on the retrieved scores.

25. The method of claim 24, further comprising:
storing a coverage region associated with each communication path;
determining a position fix; and
determining that each communication path is available if the position fix is located within a coverage region associated with each communication path.

26. The method of claim 24, wherein receiving a request for communication further comprises receiving a request for communication from an input device operated by a user.

27. The method of claim 24, wherein:
the indicated communication attribute is necessary for communication; and
selecting a communication path further comprises selecting a communication path that is able to provide the indicated communication attribute.

28. The method of claim 24, wherein the communication attribute relates to a transmission delay or a propagation delay of a communication path.

29. The method of claim 24, wherein the communication attribute relates to the reliability of a communication path or an ability of a communication path to provide a confirmation of successful communication.

30. The method of claim 24, wherein the communication attribute relates to a capability of a communication path to communicate voice signals or a capability of a communication path to communicate data.

31. The method of claim 24, wherein the plurality of scores are numeric.

32. The method of claim 24, further comprising determining that each communication path is available prior to retrieving a score for each communication path.

33. The method of claim 32, further comprising:
determining a position fix; and
determining that each communication path is available using the position fix.

34. The method of claim 33, wherein determining a position fix further comprises using a GPS receiver to determine a position fix.

35. An apparatus for automatically selecting one of a plurality of communication paths, the apparatus comprising:

a memory operable to store a plurality of scores, each score associated with one of a plurality of communication paths and one of a plurality of communication attributes; and a processor operable to receive a request for communication, the request indicating a first communication attribute and a second communication attribute, the processor further operable to determine a total score for each communication path using a first score associated with the first communication attribute and a second score associated with the second communication attribute, the processor further operable to select a communication path based on the total scores.

36. The apparatus of claim 35, further comprising an input device operable to receive the request for communication from a user.

37. The apparatus of claim 35, wherein:

the first communication attribute is necessary; and the processor selects a communication path that is able to provide the first communication attribute.

38. The apparatus of claim 35, wherein the first communication attribute relates to a transmission delay or a propagation delay of a communication path.

39. The apparatus of claim 35, wherein the first communication attribute relates to the reliability of a communication path or an ability of a communication path to provide a confirmation for a receipt of a communication.

40. The apparatus of claim 35, wherein the first communication attribute relates to a capability of a communication path to deliver voice signals or an ability of a communication path to carry data.

41. The apparatus of claim 35, wherein:

the first score and the second score are numeric; and the processor determines the total score by summing the first score and the second score.

42. The apparatus of claim 35, wherein the processor retrieves the first score, retrieves the second score, and determines the total score using the retrieved first score and the retrieved second score.

43. The apparatus of claim 35, further comprising a positioning device coupled to the processor and operable to determine a position fix, wherein the processor is further operable to use the position fix to determine whether each communication path is available.

44. The apparatus of claim 43, wherein the positioning device is a GPS receiver.

45. The apparatus of claim 43, wherein the processor determines that each communication path is available if the position fix is located within a coverage region associated with each communication path.

46. A method for automatically selecting one of a plurality of communication paths, the method comprising:

storing a plurality of scores, each score associated with one of a plurality of communication paths and one of a plurality of communication attributes;

receiving a request for communication, the request indicating a first communication attribute and a second communication attribute;

determining a total score for each communication path by using a first score associated with the first communication attribute and a second score associated with the second communication attribute; and selecting a communication path based on the total scores.

47. The method of claim 46, further comprising:

storing a coverage region associated with each communication path;

determining a position fix; and determining that each communication path is available if the position fix is located within a coverage region associated with each communication path.

48. The method of claim 46, wherein receiving a request for communication further comprises receiving a request for communication from an input device operated by a user.

49. The method of claim 46, wherein:

the first communication attribute is necessary for communication; and selecting a communication path further comprises selecting a communication path that is able to provide the first communication attribute.

50. The method of claim 46, wherein the first communication attribute relates to a transmission delay or a propagation delay of a communication path.

51. The method of claim 46, wherein the first communication attribute relates to the reliability of a communication path or an ability of a communication path to provide a confirmation of successful communication.

52. The method of claim 46, wherein the first communication attribute relates to a capability of a communication path to deliver voice signals or an ability of a communication path to carry data.

53. The method of claim 46, wherein the scores are numeric and determining a total score further comprises summing the first score and the second score.

54. The method of claim 46, wherein the scores are numeric and determining a total score further comprises:

retrieving the first score;

retrieving the second score; and determining the total score by summing the retrieved first score and the retrieved second score.

55. The method of claim 46, further comprising determining that each communication path is available prior to determining a total score.

56. The method of claim 55, further comprising:

determining a position fix; and determining that each communication path is available using the position fix.

57. The method of claim 56, wherein determining a position fix further comprises using a GPS receiver to determine a position fix.

* * * * *